United States Patent
Zhang et al.

(10) Patent No.: US 10,202,841 B2
(45) Date of Patent: Feb. 12, 2019

(54) NEAR-BIT TOOL ATTITUDE MEASUREMENT WHILE DRILLING APPARATUS AND METHOD

(71) Applicant: Institute of Geology and Geophysics, Chinese Academy of Sciences, Beijing (CN)

(72) Inventors: Wenxiu Zhang, Beijing (CN); Qingyun Di, Beijing (CN); Wenxuan Chen, Beijing (CN); Yongyou Yang, Beijing (CN); Yuntao Sun, Beijing (CN); Jian Zheng, Beijing (CN); Jianguang Liu, Beijing (CN)

(73) Assignee: INSTITUTE OF GEOLOGY AND GEOPHYSICS, CHINESE ACADEMY OF SCIENCES, Beijing (CN)

(*) Notice: Subject to any disclaimer, the term of this patent is extended or adjusted under 35 U.S.C. 154(b) by 16 days.

(21) Appl. No.: 15/689,879

(22) Filed: Aug. 29, 2017

(65) Prior Publication Data
US 2018/0058192 A1 Mar. 1, 2018

(30) Foreign Application Priority Data
Aug. 29, 2016 (CN) .......................... 2016 1 0772580

(51) Int. Cl.
*E21B 47/024* (2006.01)
*E21B 47/06* (2012.01)
(Continued)

(52) U.S. Cl.
CPC .......... *E21B 47/024* (2013.01); *E21B 47/065* (2013.01); *G01V 11/002* (2013.01); *E21B 7/04* (2013.01); *E21B 17/16* (2013.01)

(58) Field of Classification Search
CPC .................................................. E21B 47/024
(Continued)

(56) References Cited

U.S. PATENT DOCUMENTS 7,096,313 B1 8/2006 Chang et al.
7,762,854 B1 7/2010 Peng
(Continued)

FOREIGN PATENT DOCUMENTS

CN 1740746 A 3/2006
CN 2849164 Y 12/2006
(Continued)

*Primary Examiner* — Ricky Ngon
(74) *Attorney, Agent, or Firm* — Novick, Kim & Lee, PLLC; Allen Xue

(57) ABSTRACT

A near-bit tool attitude MWD apparatus includes measurement sensors and a measurement circuit. The measurement sensors transmit measured signals to the measurement circuit, and the measurement circuit processes and calculates the signals to obtain attitude data. The measurement sensors include a triaxial accelerometer, a triaxial gyroscope, a triaxial magnetic sensor and a temperature sensor, the measured data of the triaxial accelerometer, the triaxial gyroscope and the triaxial magnetic sensor are respectively corrected using the measured data of the temperature sensor, a first attitude angle is calculated using the corrected measured data of the triaxial accelerometer and the triaxial magnetic sensor. Quaternions are initialized using the first attitude angle, and the initialized quaternions are subjected to time updating according to the measured data of the triaxial gyroscope, and further an attitude angle is calculated utilizing the updated quaternions. The quaternions are periodically initialized to eliminate cumulative errors of the triaxial gyroscope, so as to improve the near-bit tool attitude MWD accuracy.

10 Claims, 2 Drawing Sheets

(51) Int. Cl.
*G01V 11/00* (2006.01)
*E21B 7/04* (2006.01)
*E21B 17/16* (2006.01)

(58) Field of Classification Search
USPC .......................................................... 702/9
See application file for complete search history.

(56) References Cited

U.S. PATENT DOCUMENTS

| | | |
|---|---|---|
| 2001/0012703 A1 | 8/2001 | Wurm et al. |
| 2002/0075114 A1 | 6/2002 | Hall et al. |
| 2007/0073482 A1* | 3/2007 | Churchill ............. G01C 21/165 |
| | | 701/492 |
| 2007/0247329 A1 | 10/2007 | Petrovic et al. |
| 2009/0023502 A1 | 1/2009 | Koger |
| 2009/0153355 A1 | 6/2009 | Price et al. |
| 2012/0249338 A1 | 10/2012 | Merino |
| 2012/0299743 A1 | 11/2012 | Price et al. |
| 2014/0332235 A1 | 11/2014 | Mueller et al. |
| 2015/0078653 A1* | 3/2015 | Tafazoli Bilandi .. G06K 9/4604 |
| | | 382/154 |
| 2015/0107824 A1* | 4/2015 | Signorelli ........... E21B 41/0085 |
| | | 166/244.1 |
| 2016/0047675 A1* | 2/2016 | Tanenhaus ........... G01C 25/005 |
| | | 702/104 |

FOREIGN PATENT DOCUMENTS

| | | |
|---|---|---|
| CN | 101289935 A | 10/2008 |
| CN | 201221354 Y | 4/2009 |
| CN | 101493008 A | 7/2009 |
| CN | 102418516 A | 4/2012 |
| CN | 202187758 U | 4/2012 |
| CN | 103061755 A | 4/2013 |
| CN | 103577121 A | 2/2014 |
| CN | 204283400 U | 4/2015 |
| CN | 204283413 U | 4/2015 |
| CN | 105353357 A | 2/2016 |
| CN | 105760113 A | 7/2016 |
| CN | 105804722 A | 7/2016 |
| CN | 206299372 U | 7/2017 |
| CN | 206299375 U | 7/2017 |

* cited by examiner

NEAR-BIT TOOL ATTITUDE MEASUREMENT WHILE DRILLING APPARATUS AND METHOD

TECHNICAL FIELD

The present invention mainly belongs to the field of measurement while drilling (MWD) in oil and gas exploration, and in particular relates to a near-bit tool attitude MWD apparatus and method.

BACKGROUND

Directional drilling is a technology of directing a wellbore along a predefined trajectory leading to a subsurface target. Directional drilling is an important technical means for sidetracking of an existing well, drilling multilateral wells, extended reach wells, or horizontal wells. Directional drilling can be employed to reach locations inaccessible to the drilling rig and to further develop oil and gas resources economically and effectively. Directional drilling can significantly improve the oil and gas production, reduce the cost and time of drilling operations. In addition it is conducive to protecting the environment. During the directional drilling process, a comprehensive knowledge of the wellbore direction and the drill bit orientation is essential to guarantee proper drilling procedure. Accurate attitude measurement of a downhole drilling tool not only ensures efficient drilling for predefined targets but also avoids collision with other wells in proximity. Thus, in addition to the conventional bottom hole assembly (e.g., including a drill bit, a positive displacement motor, a stabilizer, a drill collar, etc.), the directional drilling tool requires position sensors to measure the attitude of the downhole drilling tool, including an azimuth angle (a deviation angle from the north orientation in a horizontal plane), an inclination angle (a deviation angle from the vertical direction, also known as a pitch angle) and a toolface angle (equivalent to a roll angle in navigation).

With further exploration and development of oil fields, developing difficult-to-produce deposits, such as thin reservoirs, fault block reservoirs, marginal reservoirs and remaining reservoirs have been carried out, and requirements for accurate trajectory control are also increasing. In order to enlarge the contact area with oil and gas reservoirs in the wellbore, thereby increasing the production of oil wells, it is necessary to keep wellbore trajectory in the reservoir accurately. In order to obtain trajectory parameters near bit, a distance between downhole position sensors and the drill bit is important. An attitude measurement tool based on current MWD technology is installed behind a steerable tool, and attitude parameters including inclination, azimuth, toolface angles are measured 8 m to 20 m behind the drill bit, thus it is difficult to obtain a true wellbore position at the drill bit and determine the actual condition of entering the reservoir.

From the perspective of an attitude angle measurement principle, the existing MWD system includes two main technical lines, namely, a MWD system based on magnetic sensors and accelerometers as well as a MWD system based on gyroscopes and accelerometers.

(1) The MWD System Based on Magnetic Sensors and Accelerometers

An angle measurement unit of this type of MWD system consists of three orthogonal accelerometers and three orthogonal magnetic sensors. Quartz flexible accelerometers are generally selected as the accelerometers, and fluxgate magnetometers are generally selected as the magnetic sensors. Measurement results of the accelerometers are used to calculate the inclination angle and the toolface angle, and the azimuth angle is obtained using the inclination angle, the toolface angle and geomagnetic field data. As a result of reference to the magnetic north to measure an azimuth, the magnetometers require a clean environment without magnetic interference. A big problem faced by MWD systems based on magnetometers is magnetic interference, which mainly includes magnetic interference of a drill string itself and external magnetic interference generated by a surrounding environment. The magnetic interference of the drill string mainly affects the magnetometer along a direction of a rotation axis of the drilling tool, while the external magnetic interferences have effects on the three magnetometers. The external magnetic interference mainly comes from ferromagnetic casings of a producing well nearby, pyrite and other strata, solar storms, drilling fluid components, magnetic hot spots, and the like. The presence of the magnetic interference negatively affects azimuth measurement accuracy. A conventional MWD system is usually installed in the middle of a nearly 9-meter-long non-magnetic drill collar to isolate the magnetic interference of an upper drill string from the magnetic interference of a lower drill string as far as possible, but a near-bit attitude measuring apparatus needs to be installed immediately adjacent to the drill bit, and the magnetic interference generated by the drill bit and a steerable drilling tool is more serious than that of the conventional MWD system.

(2) The MWD System Based on Gyroscopes and Accelerometers

This type of MWD system uses gyroscopes to measure a change in an angular velocity along a sensitive axis of a sensor, which has been currently applied in the field of directional drilling. A gyroscope technology has an advantage in application scenarios where geomagnetic fields are shielded or magnetic interference is serious because the magnetic interference does not affect the performance of the gyroscope. At present, due to instrument sizes, robustness under vibration and shock condition, gyroscope measurement accuracy and other factors, the gyroscope technology is mainly applied in a wireline measurement system, and also has some restrictions in while drilling application scenarios. The maximum problem of the MWD system based on gyroscopes and accelerometers is that larger steady state errors may be introduced due to the larger output signal drift rate of an angular velocity gyroscope and the higher divergence angle of an integrated attitude angle. There are cumulative errors, greater cumulative errors especially in an underground high-temperature environment, since the output of the gyroscope increases with measurement time, and the volume and the reliability difficulty meet hostile operating conditions and a narrow space near the drill bit.

In summary, both the MWD system based on magnetic sensors and accelerometers and the MWD system based on gyroscopes and accelerometers have limitations in the application scenarios, especially for near-bit tool attitude measurement, and have difficulties in complex application environments such as downhole high temperature, severe vibration and shock, strong magnetic interference, and limited installation space.

SUMMARY

In view of the above-mentioned problems, the present disclosure provides a near-bit tool attitude MWD apparatus and method, which overcome inherent defects (e.g., a micro inertia component cumulative error problem and a geomagnetic field measurement interference problem) existing in a single attitude measurement method by utilizing a combined attitude measurement technology, effectively improve the attitude measurement accuracy of a downhole drilling tool by multi-sensor information fusion, have the advantages of small size and low power consumption, are conducive to extend downhole working hours under a battery-powered condition.

The present invention is achieved by the following technical solution:

a near-bit tool attitude MWD apparatus includes measurement sensors and a measurement circuit, wherein the measurement sensors transmit measured signals to the measurement circuit, and the measurement circuit processes and calculates the signals to obtain attitude data. The measurement sensor includes a triaxial accelerometer, a triaxial gyroscope, a triaxial magnetic sensor and a temperature sensor. The measured data of the triaxial accelerometer, the triaxial gyroscope and the triaxial magnetic sensor are respectively corrected using the measured data of the temperature sensor. An initial attitude angle is calculated using the corrected measured data of the triaxial accelerometer and the triaxial magnetic sensor. Quaternions are initialized using the initial attitude angle, and the initialized quaternions are subjected to time updating according to the measured data of the triaxial MEMS gyroscope, and further an attitude angle is calculated utilizing the updated quaternions. The quaternions are periodically initialized to eliminate cumulative errors of the triaxial gyroscope.

Further, the measurement sensors are installed in an X axis, a Y axis, or a Z axis orthogonally to each other, respectively. In each axial direction, directions of sensitive axes of the accelerometer, the gyroscope and the magnetic sensor remain parallel.

Further, the measurement circuit includes an analog-to-digital converter, a field programmable gate array (FPGA), a memory, a processor and a number of low-pass filters. The low-pass filters eliminate high-frequency interferences from output signals of the triaxial accelerometer, the triaxial gyroscope, the triaxial magnetic sensor and the temperature sensor, respectively. The filters have cut-off frequencies that match frequency bands of the accelerometer, the gyroscope, the magnetic sensor, or the temperature sensor as well as drilling rotation speeds.

Further, the measurement circuit is structured as follows: high-frequency interferences in analog signals outputted by measurement sensors are filtered out by the low-pass filter, the filtered output signals of the measurement sensors are subjected to acquisition by the analog-to-digital converter, and the acquired timing control is realized by the FPGA, while the FPGA performs digital filtering on the acquired original data, and sends it to the processor according to a communication protocol after packetizing, the processor stores original time series data in the memory, while the attitude angle is solved, and the processor includes an attitude angle calculation module, a quaternion initialization module and a quaternion updating module.

Further, the memory stores calibration coefficients of the accelerometer, the magnetic sensor and the gyroscope.

Further, the accelerometer is a MEMS accelerometer, the gyroscope is a MEMS gyroscope, and the magnetic sensor is a magnetoresistive sensor.

Further, the triaxial accelerometer, the triaxial gyroscope, the triaxial magnetic sensor and the temperature sensor are measured in a synchronous acquisition mode.

Further, the attitude angle includes an inclination angle, an azimuth angle, and a toolface angle.

Further, the apparatus is installed in a mud channel at the center of a drill collar or installed on the surface of the drill collar in a slotting manner.

A near-bit tool attitude MWD method includes the following steps: correcting measured data of a triaxial accelerometer, a triaxial gyroscope, and a triaxial magnetic sensor utilizing measured data of a temperature sensor, respectively, and calculating a first attitude angle utilizing the corrected measured data of the triaxial accelerometer and the triaxial magnetic sensor, initializing quaternions utilizing the first attitude angle, and performing time updating on the initialized quaternions according to the measured data of the triaxial MEMS gyroscope, and further calculating an attitude angle by using the updated quaternions; and periodically initializing the quaternions to eliminate cumulative errors of the triaxial MEMS gyroscope.

Further, the method further includes: correcting calibration coefficients and installation errors of the accelerometer, the magnetic sensor and the gyroscope by utilizing the stored calibration coefficients of the accelerometer, the magnetic sensor and the gyroscope.

Further, the time period may be 1 second to 10 seconds, and is determined according to a rotation speed of the drilling tool and an updating rate of attitude data.

The present invention has the advantageous effects:

(1) based on a combination of micro-inertia components and magnetoresistive sensors, the size is small, the power consumption is low, and satisfies requirements for a limited installation space and longer working time of a battery-powered near-bit tool attitude measurement apparatus; and (2) attitude measurement is implemented by an inertia and geomagnetism combination, inherent defects (a micro-inertia component cumulative error problem and a geomagnetic field measurement interference problem) existing in a single attitude measurement method can be avoided, and the attitude measurement accuracy of the downhole drilling tool is effectively improved by multi-sensor information fusion, and thus the present invention is suitable for complex drilling measurement application scenarios.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Example 1

A near-bit tool attitude MWD apparatus includes measurement sensors and a measurement circuit. The measurement sensors transmit measured signals to the measurement circuit. The measurement circuit processes and calculates the signals to obtain attitude data. The measurement sensors include a triaxial accelerometer, a triaxial gyroscope, a triaxial magnetic sensor, and a temperature sensor. The measurement sensors are arranged along an X axis, a Y axis, or a Z axis that are orthogonal to each other. In each axial direction, the directions of sensitive axes of different sensors installed remain parallel.

The measurement circuit includes an analog-to-digital converter, a field programmable gate array (FPGA), a memory, a processor, and a number of low-pass filters. The low-pass filters eliminate high-frequency interferences from output signals of the triaxial MEMS accelerometer, the triaxial MEMS gyroscope, the triaxial magnetic sensor, and the temperature sensor, respectively.

The circuit of the apparatus is structured as follows: high-frequency interferences in an analog signal outputted by the sensor are filtered out by the low-pass filters. For frequency bands of different sensors and drilling rotation speeds, filters with cut-off frequencies matching them are employed. Meanwhile, the low-pass filters coupled with the A/D converter further play a role of anti-aliasing filtering. The filtered output signals of the sensors are sent to the analog-to-digital converter. The acquired timing control is realized by the field programmable gate array (FPGA). The FPGA performs digital filtering on the acquired original data, and sends it to an ARM microprocessor according to a communication protocol after packetizing. The microprocessor stores original time series data in a FLASH memory, while an inclination angle, an azimuth angle and a toolface angle are solved.

Figure 1:
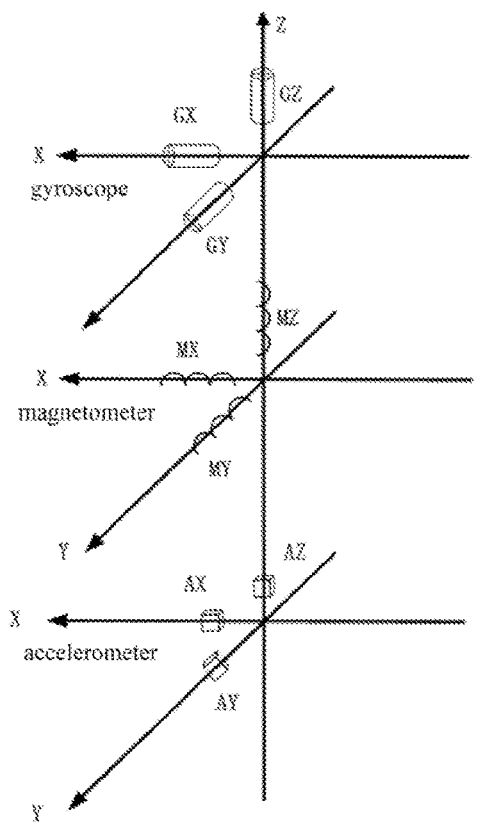
FIG. 1 is a schematic diagram showing the installation of a triaxial accelerometer, a triaxial gyroscope and a triaxial magnetic sensor.
Figure 2:
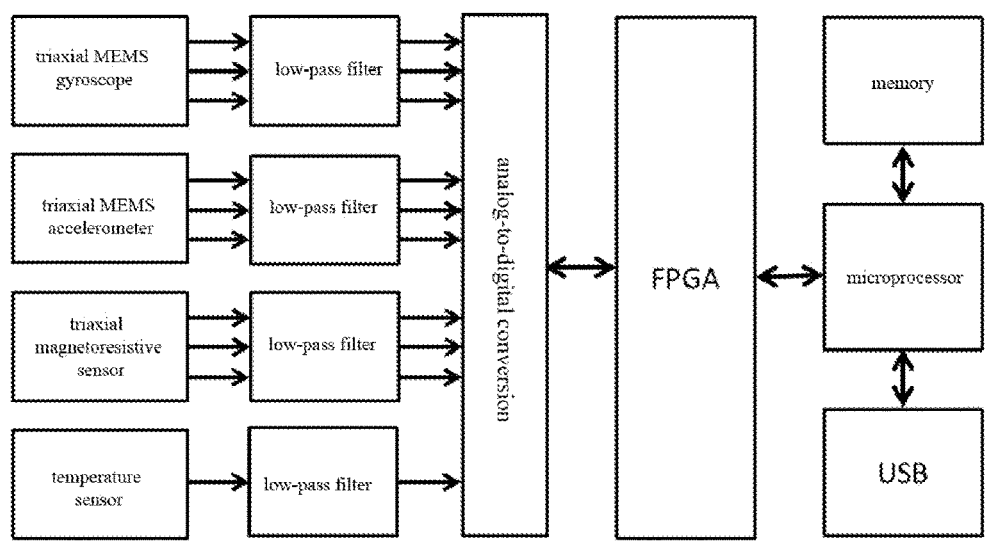
FIG. 2 is a circuit diagram of a near-bit tool attitude MWD apparatus.
Figure 3:
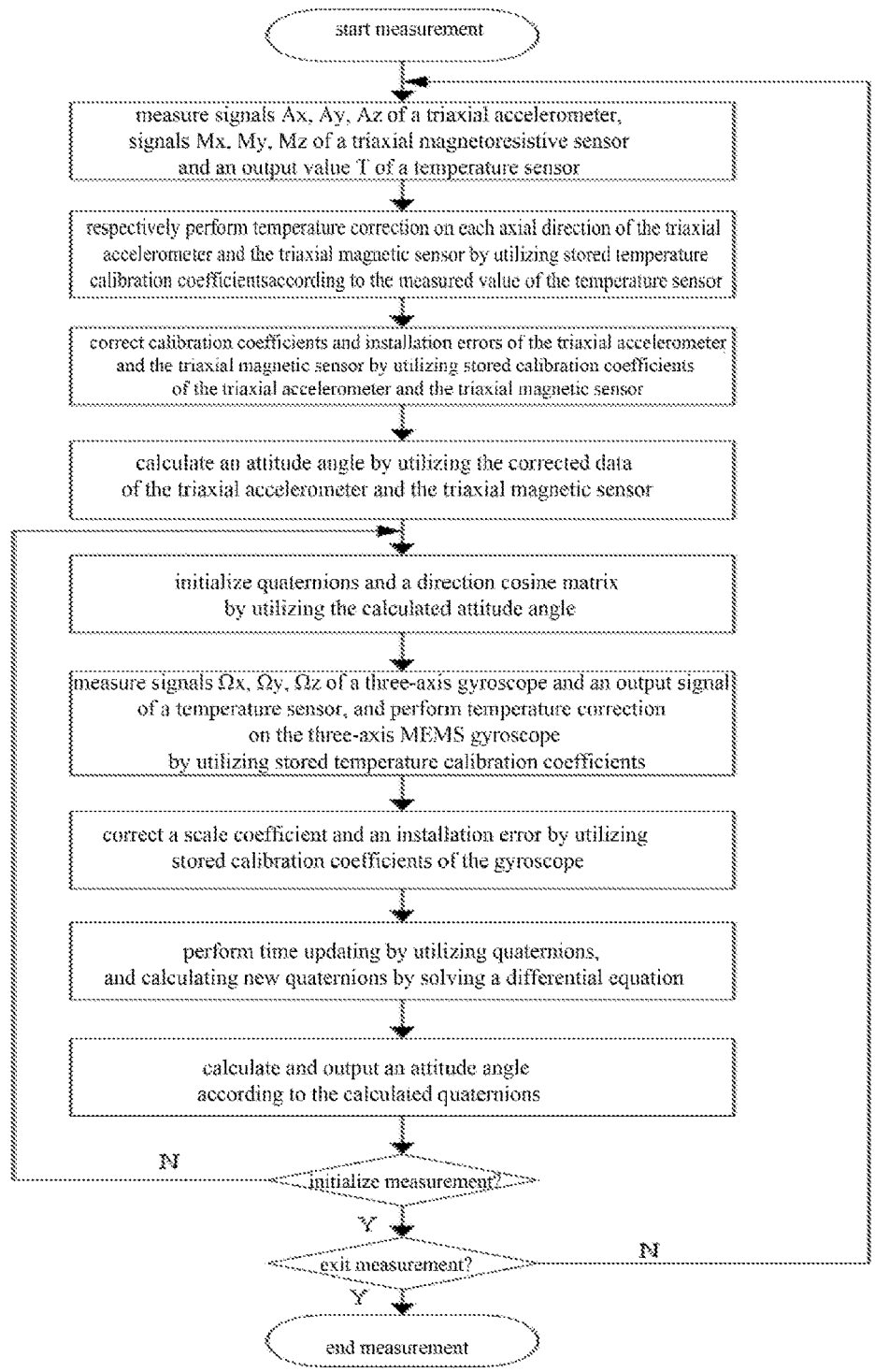
FIG. 3 is a flow diagram of a near-bit tool attitude MWD method.

As shown in FIG. 2, the original data and a calculation result are uploaded to a computer through a USB bus, which facilitates processing and verifying of a complex algorithm. The microprocessor includes an attitude angle calculation module, a quaternion initialization module, and a quaternion updating module. A method for calculating an attitude angle by the microprocessor is as shown in FIG. 3.

The apparatus is installed in a mud channel at the center of a drill collar or installed in a slot on the surface of the drill collar.

The near-bit tool attitude MWD method specifically includes the following steps:

(1) measuring signals $A_x$, $A_y$, $A_z$ of a triaxial accelerometer, signals $M_x$, $M_y$, $M_z$ of a triaxial magnetoresistive sensor and an output value T of a temperature sensor;

(2) respectively performing temperature correction on each axial direction of the triaxial accelerometer and the triaxial magnetic sensor utilizing stored temperature calibration coefficients according to the measured value of the temperature sensor;

(3) correcting scale coefficients and installation errors of the triaxial accelerometer and the triaxial magnetic sensor utilizing stored calibration coefficients of the triaxial accelerometer and the triaxial magnetic sensor; a correction formula of the accelerometer is as follows:

$$\begin{bmatrix} a_x \\ a_y \\ a_z \end{bmatrix} = \begin{bmatrix} K_{x1} & K_{xy} & K_{xz} \\ K_{yx} & K_{y1} & K_{yz} \\ K_{zx} & K_{zy} & K_{z1} \end{bmatrix} \times \left( \begin{bmatrix} A_x \\ A_y \\ A_z \end{bmatrix} - \begin{bmatrix} K_{x0} \\ K_{y0} \\ K_{z0} \end{bmatrix} \right)$$

$a_x$, $a_y$, and $a_z$ are acceleration values after compensation, $A_x$, $A_y$ and $A_z$ are originally measured acceleration values, $$K_1 = \begin{bmatrix} K_{x1} & K_{xy} & K_{xz} \\ K_{yx} & K_{y1} & K_{yz} \\ K_{zx} & K_{zy} & K_{z1} \end{bmatrix}, K_0 = \begin{bmatrix} K_{x0} \\ K_{y0} \\ K_{z0} \end{bmatrix},$$

$K_0$ and $K_1$ are correction coefficients, and are read from a memory in an attitude measurement circuit of the apparatus.

A correction formula of the magnetic sensor is as follows:

$$\begin{bmatrix} m_x \\ m_y \\ m_z \end{bmatrix} = \begin{bmatrix} S_{x1} & S_{xy} & S_{xz} \\ S_{yx} & S_{y1} & S_{yz} \\ S_{zx} & S_{zy} & S_{z1} \end{bmatrix} \times \left( \begin{bmatrix} M_x \\ M_y \\ M_z \end{bmatrix} - \begin{bmatrix} S_{x0} \\ S_{y0} \\ S_{z0} \end{bmatrix} \right)$$

$m_x$, $m_y$ and $m_z$ are magnetic field values after compensation, $M_x$, $M_y$ and $M_z$ are magnetic field values before compensation, $$S_0 = \begin{bmatrix} V_x \\ V_x \\ V_z \end{bmatrix}, S_2 = \begin{bmatrix} S_{x1} & S_{xy} & S_{xz} \\ S_{yx} & S_{y1} & S_{yz} \\ S_{zx} & S_{zy} & S_{z1} \end{bmatrix},$$

and $S_0$ and $S_1$ are correction coefficients and are read from the memory in the attitude measurement circuit of the apparatus.

(4) calculating a first attitude angle utilizing the corrected data of the triaxial accelerometer and the triaxial magnetic sensor;

$$\theta = \arctan\left(\frac{\sqrt{a_x^2 + a_y^2}}{a_z}\right)$$

$$\varphi = -\arctan\left(\frac{a_y}{a_x}\right)$$

$$\Psi = \arctan\left(\frac{m_x * \sin\varphi + m_y * \cos\varphi}{-m_x * \cos\varphi * \sin\theta + m_y * \sin\varphi * \cos\theta + m_z * \cos\theta}\right)$$

wherein $\theta$ is an inclination angle, $\varphi$ is a toolface angle, and w is an azimuth angle;

(5) initializing quaternions by utilizing the first attitude angle;

$$Q = \begin{bmatrix} q_0 \\ q_1 \\ q_2 \\ q_3 \end{bmatrix} = \begin{bmatrix} \cos\frac{\psi}{2}\cos\frac{\theta}{2}\cos\frac{\varphi}{2} - \sin\frac{\psi}{2}\sin\frac{\theta}{2}\sin\frac{\varphi}{2} \\ \cos\frac{\psi}{2}\sin\frac{\theta}{2}\cos\frac{\varphi}{2} - \sin\frac{\psi}{2}\cos\frac{\theta}{2}\sin\frac{\varphi}{2} \\ \cos\frac{\psi}{2}\cos\frac{\theta}{2}\sin\frac{\varphi}{2} + \sin\frac{\psi}{2}\sin\frac{\theta}{2}\cos\frac{\varphi}{2} \\ \cos\frac{\psi}{2}\sin\frac{\theta}{2}\sin\frac{\varphi}{2} + \sin\frac{\psi}{2}\cos\frac{\theta}{2}\cos\frac{\varphi}{2} \end{bmatrix}$$

wherein $q_0$, $q_1$, $q_2$ and $q_3$ represent the quaternions;

(6) measuring signals $\Omega_x$, $\Omega_y$, $\Omega_z$ of the triaxial gyroscope and the output signal T of the temperature sensor, and respectively performing temperature correction on each axial direction of the signals $\Omega_x$, $\Omega_y$, $\Omega_z$ of the triaxial gyroscope by utilizing stored temperature calibration coefficients according to the measured value of the temperature sensor;

(7) correcting a scale coefficient and an installation error by utilizing stored calibration coefficient of the gyroscope;

$$\begin{bmatrix} \omega_x \\ \omega_y \\ \omega_z \end{bmatrix} = \begin{bmatrix} W_{x1} & W_{xy} & W_{xz} \\ W_{yx} & W_{y1} & W_{yz} \\ W_{zx} & W_{zy} & W_{z1} \end{bmatrix} \times \left( \begin{bmatrix} \Omega_x \\ \Omega_y \\ \Omega_z \end{bmatrix} - \begin{bmatrix} W_{x0} \\ W_{y0} \\ W_{z0} \end{bmatrix} \right)$$

$\omega_x$, $\omega_y$, and $\omega_z$ are angular velocity values after compensation, $\Omega_x$, $\Omega_y$ and $\Omega_z$ are originally measured angular velocity, $$W_1 = \begin{bmatrix} W_{x1} & W_{xy} & W_{xz} \\ W_{yx} & W_{y1} & W_{yz} \\ W_{zx} & W_{zy} & W_{z1} \end{bmatrix}, W_0 = \begin{bmatrix} W_{z0} \\ W_{x0} \\ W_{y0} \end{bmatrix},$$

and $W_0$ and $W_1$ are correction coefficients, and are read from the memory in the attitude measurement circuit of the apparatus;

(8) performing time updating by using the quaternions, and calculating new quaternions by solving a differential equation;

$$\begin{bmatrix} \dot{q}_0 \\ \dot{q}_1 \\ \dot{q}_2 \\ \dot{q}_3 \end{bmatrix} = \frac{1}{2} \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \begin{bmatrix} q_0 \\ q_1 \\ q_2 \\ q_3 \end{bmatrix}$$

(9) calculating a second attitude angle according to the new quaternions;

$$\theta = \arcsin(2(q_1 q_3 - q_0 q_2))$$
$$\varphi = \arctan\left( \frac{2(q_2 q_3 - q_0 q_1)}{q_0^2 - q_1^2 - q_2^2 + q_3^2} \right)$$
$$\psi = \arctan\left( \frac{2(q_1 q_3 + q_0 q_2)}{q_0^2 + q_1^2 - q_2^2 + q_3^2} \right)$$

(10) measuring the next set of data of the gyroscope, and repeating the steps (7) to (9) to calculate a third attitude angle; and

(11) after 1 s to 10 s, going to the step (1), calculating the first attitude angle reusing data of the triaxial accelerometer and the triaxial magnetic sensor, and initializing the quaternions to eliminate cumulative errors of the gyroscope.

The near-bit tool attitude MWD method is shown in FIG. 3.

The near-bit tool attitude MWD apparatus can be packaged on a chip or as a plurality of chips on a substrate. The apparatus is installed on a drill collar, e.g., in the center of the drill collar near the mud channel or in a slot on the surface of the drill collar. The drill collar is a part of the bottomhole assembly near the bottom of a drillstring. For example, the drill collar is installed right above the near-bit stabilizer. In another example, the drill collar having the near-bit tool attitude MWD apparatus is less than 6 meters from the drill bit, preferably less than 4 meter, and more preferably less than 3 meters from the drill bit.

The invention claimed is:

1. A near-bit tool attitude measurement while drilling method, comprising:
   (1) installing a measurement-while-drilling (MWD) apparatus in a bottomhole assembly near a bottom of a drill string above a near-bit stablizer,
   wherein the MWD apparatus comprises a plurality of measurement sensors coupled to a measurement circuit, wherein the plurality of measurement sensors include a triaxial accelerometer, a triaxial gyroscope, a triaxial magnetic sensor, and a temperature sensor,
   wherein the measurement circuit comprises a plurality of low-pass filters coupled to an analog-to-digital converter, a field programmable gate array coupled to the analog-to-digital convertor, a processor coupled to the field programmable gate array, a memory coupled to the processor, and
   wherein each of the triaxial accelerometer, the triaxial gyroscope, the triaxial magnetic sensor, and the temperature sensor is coupled to one of the plurality of low-pass filters;
   (2) measuring data of the triaxial accelerometer, the triaxial gyroscope, the triaxial magnetic sensor, and the temperature sensor using the MWD apparatus; correcting measured data of the triaxial accelerometer and the triaxial magnetic sensor by utilizing measured data of the temperature sensor, respectively; and calculating a first attitude angle by utilizing corrected measured data of the triaxial accelerometer and the triaxial magnetic sensor;
   (3) initializing quaternions by utilizing the first attitude angle;
   (4) correcting measured data of the triaxial gyroscope by utilizing the measured data of the temperature sensor; performing time updating on initialized quaternions according to the measured data of the triaxial gyroscope; and further calculating a second attitude angle by utilizing the updated quaternions;
   (5) measuring data of the triaxial gyroscope, and repeating the step (4) to calculate a third attitude angle; and
   (6) after 1 s to 10 s, going to the step (2), calculating the first attitude angle by reusing the data of the triaxial accelerometer and the triaxial magnetic sensor, initializing the quaternions by using the first attitude angle, and periodically initializing the quaternions to eliminate cumulative errors of the triaxial MEMS gyroscope.

2. The method according to claim 1, further comprising: correcting calibration coefficients and installation errors of the accelerometer, the magnetic sensor, and the gyroscope by utilizing stored calibration coefficients of the accelerometer, the magnetic sensor, and the gyroscope.

3. The method according to claim 1, wherein the triaxial accelerometer, the triaxial gyroscope and the triaxial magnetic sensor are arranged in an X axis, a Y axis, or a Z axis that are orthogonally to each other, and in each axial direction, directions of sensitive axes of the accelerometer, the gyroscope and the magnetic sensor are parallel.

4. The method according to claim 1, wherein high-frequency interferences in analog signals outputted by measurement sensors are filtered out by the low-pass filters, the filtered output signals of the measurement sensors are subjected to acquisition by the analog-to-digital converter, and the timing control of the analog-to-digital converter is realized by a field programmable gate array, while the field programmable gate array performs digital filtering on acquired original data, and sends the filtered data to the processor according to a communication protocol after packetizing, the processor stores original time series data in the memory, while the attitude angle is solved, and the processor comprises an attitude angle calculation module, a quaternion initialization module and a quaternion updating module.

5. The method according to claim 1, wherein the accelerometer is a micro electromechanical system (MEMS) accelerometer, the gyroscope is a MEMS gyroscope, and the magnetic sensor is a magnetoresistive sensor.

6. The method according to claim 1, wherein the memory stores calibration coefficients of the accelerometer, the magnetic sensor and the gyroscope.

7. The method according to claim 1, wherein the attitude angle comprises an inclination angle, an azimuth angle, and a toolface angle.

8. The method according to claim 1, wherein the MWD apparatus is disposed less than 6 meters from a drill bit.

9. The method according to claim 8, wherein the MWD apparatus is disposed less than 4 meters from the drill bit.

10. The method according to claim 9, wherein the MWD apparatus is disposed less than 3 meters from the drill bit.

* * * * *